(12) United States Patent
Bird et al.

(10) Patent No.: US 7,381,014 B1
(45) Date of Patent: Jun. 3, 2008

(54) NATURAL ANALOG SYSTEM FOR REDUCING PERMEABILITY OF GROUND

(76) Inventors: John M. Bird, 1187 Ellis Hollow Rd., Ithaca, NY (US) 14850; George W. Putman, 23 Waterview Dr., Saratoga Springs, NY (US) 12866

( * ) Notice: Subject to any disclaimer, the term of this patent is extended or adjusted under 35 U.S.C. 154(b) by 0 days.

(21) Appl. No.: 10/983,272

(22) Filed: Nov. 8, 2004

(51) Int. Cl.
*C09K 17/02* (2006.01)

(52) U.S. Cl. .................................................. 405/263

(58) Field of Classification Search ............... 588/256; 405/263, 266
See application file for complete search history.

(56) References Cited

U.S. PATENT DOCUMENTS

| | | | | |
|---|---|---|---|---|
| 2,437,387 A | * | 3/1948 | Hodgson | 405/263 |
| 3,869,386 A | * | 3/1975 | Izdebski | 588/318 |
| 4,354,942 A | * | 10/1982 | Kaczur et al. | 588/256 |
| 4,869,621 A | | 9/1989 | McLaren et al. | |
| 4,950,409 A | * | 8/1990 | Stanforth | 405/129.25 |
| 4,981,394 A | * | 1/1991 | McLaren et al. | 588/17 |
| 5,130,051 A | * | 7/1992 | Falk | 588/257 |
| 5,202,033 A | * | 4/1993 | Stanforth et al. | 210/747 |
| 5,545,805 A | * | 8/1996 | Chesner | 588/318 |
| 5,846,178 A | * | 12/1998 | Forrester | 588/256 |
| 5,944,446 A | * | 8/1999 | Hocking | 405/129.4 |
| 6,399,848 B1 | * | 6/2002 | Rechichi | 588/2 |

FOREIGN PATENT DOCUMENTS

JP       03170596 A  *  7/1991

* cited by examiner

*Primary Examiner*—John Kreck
(74) *Attorney, Agent, or Firm*—GFD Patents, LLC; Gerald F. Dudding

(57) ABSTRACT

A method of chemically and physically treating unconsolidated soils, over burden, fill and certain waste materials (the "ground"), or partly consolidated materials that can be excavated and broken up by normal earth moving and soil mixing equipment. This treatment results in the reduction of permeability in the ground, and as a result permits the prevention or control of contaminant migration from a site containing ground wastes of various types, thereby isolating these wastes.

17 Claims, 3 Drawing Sheets

Permeability Test Results for Honeywell "Solvay" Waste (#14207D)

NATURAL ANALOG SYSTEM FOR REDUCING PERMEABILITY OF GROUND

FIELD OF THE INVENTION

This invention pertains to a system for the reduction of permeability in unconsolidated soils, over burden, fill and certain waste materials (the "ground"), or partly consolidated materials that can be excavated and broken up by normal earth moving and soil mixing equipment. The system permits the prevention or control of contaminant migration via groundwater flow or surface water (precipitation) infiltration from a site containing ground wastes (other than garbage) of various types, thereby isolating these wastes. In some applications the system may also increase the cohesion and mechanical strength of unconsolidated ground.

BACKGROUND OF THE INVENTION

In nature, the lithification of unconsolidated materials commonly occurs by the infilling of intergranular void space with interstitial material deposited from solution as mineral overgrowths and cements. This loss of void space progressively decreases the primary permeability and could reduce it to insignificance. A close natural analog of the Natural Analog System (NAS) is the formation of "caliche" soils in the southwestern United States desert regions. Such regions are typically characterized by dry lake beds that are progressively cemented by salts precipitated from the occasional run-off precipitation which reaches the lake basin and then evaporates.

Another example of a natural analog of the NAS is the formation of low permeability "hard pan" soil zones caused by precipitation of cement via ground water evaporation at the sub-surface water table interface. The most common precipitate cement in these examples are calcium carbonate ($CaCO_3$) and various forms of silica ($SiO_2$ or $SiO_x(H_2O)_y$) as compatible in ambient alkaline or acid environments, respectively. Most ground waters, however, are neutral to alkaline (pH>7.0). NAS is primarily designed for this situation.

The NAS process follows the same principle of reducing void space to reduce permeability by artificially stimulating or inducing void space filling via interstitial precipitation, crystallization, and addition of particulates plus or minus cementation to duplicate that natural process, but much faster.

Related methods of treatment of ground strata include U.S. Pat. No. 4,869,621, issued on Sep. 26, 1989 to McLaren et al. for METHOD OF SEALING PERMEABLE EARTH SURFACE OR SUBSURFACE MATERIALS HAVING ALKALINE CONDITIONS BY INDUCED PRECIPITATION OF CARBONATES. McLaren et al. propose a method of artificially sealing voids in earth strata under alkaline conditions by inducing precipitation, via pumped slurries of aqueous solutions which may include finely divided solids, for example, of calcium carbonate, usually in the form of calcite.

U.S. Pat. No. 4,981,394, issued on Jan. 1, 1991 to McLaren et al. for METHOD OF SEALING PERMEABLE UNCONSOLIDATED MATERIALS. McLaren et al. propose a method for forming solid layers or local zones of material upon or below the earth's surface and above the water table to inhibit the flow of ground waters through such layers of materials.

The NAS process is a method of precipitating calcium carbonate cement in the ground that duplicates natural geologic cementing mechanisms. Calcium carbonate, the artificially produced product of the process, is analogous to the naturally produced calcium carbonate cements of sedimentary rock. A significant potential use, among several, of the NAS process is to reduce or eliminate ground water flow-though in contaminated soils and rocks, and thereby immobilize and isolate such sources of contamination in the natural environment. A principal advantage of the NAS process in environmental remediation and engineering applications is that the cement (calcite) is a natural analog, the permanence of which can be established by comparison with similar naturally calcite-cemented geologic materials. The NAS process introduces the concept of using such natural analog materials in environmental remediation and restoration projects rather than using artificial materials. Such artificial materials can not be assessed in terms of very long-term performance of the projects in various geologic settings.

The principal advantage of the NAS process when used in environmental remediations and restorations is that it can be applied by fluid injection in situ, that is, without excavation and processing of the contaminated-site soil or rock. A contaminated site can be isolated from the ambient ground water and immobilized as a source of hydrologically transported chemical species, without disturbance of surrounding terrain or structures. Further, the subsequent long-term performance of the remediated site can be determined by comparison with naturally occurring carbonate-cemented sites. Where appropriate, the NAS process can be applied by physically mixing NAS process components in contaminated soil and waste material to achieve remediation.

An important aspect of the NAS process is the induced precipitation of ancillary compounds that bind or capture hazardous chemical species from ground water or directly from the waste associated with a contaminated site. Such compounds are analogs of minerals known to be stable (insoluble) in such hydrogeologic conditions. The result is the immobilization of various hazardous chemical species (e.g., lead) into artificial minerals, the subsequent long-term environmental permanence of which can be documented by comparison with the equivalent naturally occurring minerals.

It is an object of this invention to reduce and/or eliminate soil/rock permeability and achieve isolation from ground water flow/pathways in land-fill, hazardous and toxic waste-site, and radioactive waste-site remediation.

SUMMARY OF THE INVENTION

In accordance with the present invention, there is provided a method of using the Natural Analog System (NAS) to reduce the permeability of ground. A waste zone is impregnated with a composition to produce a precipitate that fills pore space. The aforementioned composition can include solutions, solid-phase fillers, ancillary reactants (solutions and gases), and specific contaminant remediation agents (e.g., agents for petroleum products that are compatible with neutral to alkaline ambient conditions such as alkali silicate hydrocarbon degradation agents). This waste zone impregnating step is repeated until refusal occurs. The aqueous composition is selected from the group of:

$CaCl_2$(solution)+$Na_2CO_3$(solution), $CaCl_2$(solution)+$Na_2SO_4$(solution), $CaCl_2$(solution)+$Na_2HPO_4$(solution), CaCl$_2$(solution)+2NaOH(solution), and FeCl$_3$(solution)+3NaOH(solution)=3NaCl+Fe(OH)$_3$ The composition can also be a solution and a gas phase. In one embodiment of the preceding group, the solution is 2NaOH+CaCl$_2$, and the gas phase is CO$_2$.

First, to achieve long term stability (i.e., as a natural analog (calcite)) the treatment is stable indefinitely in the present geological or physiochemical environment. After application, because of resulting "self healing" properties within the ambient system, the treated soil/rock will not fail because of rupture or stress fracturing such as occurs in concrete, degradation or flocculation (concrete, clay caps, and slurry walls), or external changes in the state of oxidation/reduction (specific metal compound precipitates). NAS process products are stable, non-toxic analogs of naturally occurring minerals.

Second, to achieve self-healing, additional buffering and latent reactive capacity can be built into a specific application in anticipation of an unpredictable future activation, as an added protection. The treated site-system can be designed to be self-healing on a long term basis, or it can be designed to be gradually or continually implemented over time. Treatment additions or repairs to ground missed during initial application are easily performed.

Third, to provide a solution to permeability reduction that is commercially viable, the NAS process uses chemicals/preparations that are readily available in bulk commercial lots; cost-per-ton for materials is much less than cement. Waste zone permeation is proportional to void space (L+water), not to the volume dilution (3:1 and greater) required to make concrete. It is likely that application and engineering costs would dominate over the cost of materials in any commercial scale project, in terms of cost of treated material, except for projects where ground surface dispersal of the process treatment materials or constituents that utilize meteoric water infiltration are appropriate (dry-mix, least expensive application).

Fourth, to provide a solution to permeability reduction that may be implemented in otherwise untreatable waste sites, (i.e., in combination with directed drilling techniques such as navigational drilling, and geophysical methods of monitoring underground injection), it is possible to apply the NAS process to otherwise untreatable waste sites, such as where surface access is restricted, sealing beneath an existing landfill or dump, diverting groundwater flow, or treatments beneath bodies of water or in marine environments.

In addition, a further objective of this invention is to provide solutions to problems other than waste-site remediation. For example, the process can be used to stiffen or increase the cohesion of soils subject to liquefaction such as in permafrost regions (e.g., road beds, building foundations) and seismic zones; as a slurry wall substitute in areas of salt water incursion where clay walls degrade; as a cementations fill in salt water environments wherein the product hardens and is stable indefinitely; as an admixture with coal/fly/incinerator ash for disposal of the ash and/or its use to fill abandoned coal mines or other cavities or workings that are subject to collapse, or the use of the ash as a cementations slurry; as an advanced preparation of sub-soils in construction sites to mitigate the effects of future waste spills or storage (anticipatory remediation); as an injectable low-viscosity slurry in construction applications using sand or other admixtures; and various other applications wherein the natural analog advantage of the process is beneficial.

BRIEF DESCRIPTION OF THE DRAWINGS

A complete understanding of the present invention may be obtained by reference to the accompanying drawings, when considered in conjunction with the subsequent detailed description, in which.

DETAILED DESCRIPTION OF THE PREFERRED EMBODIMENT

Figure 1:
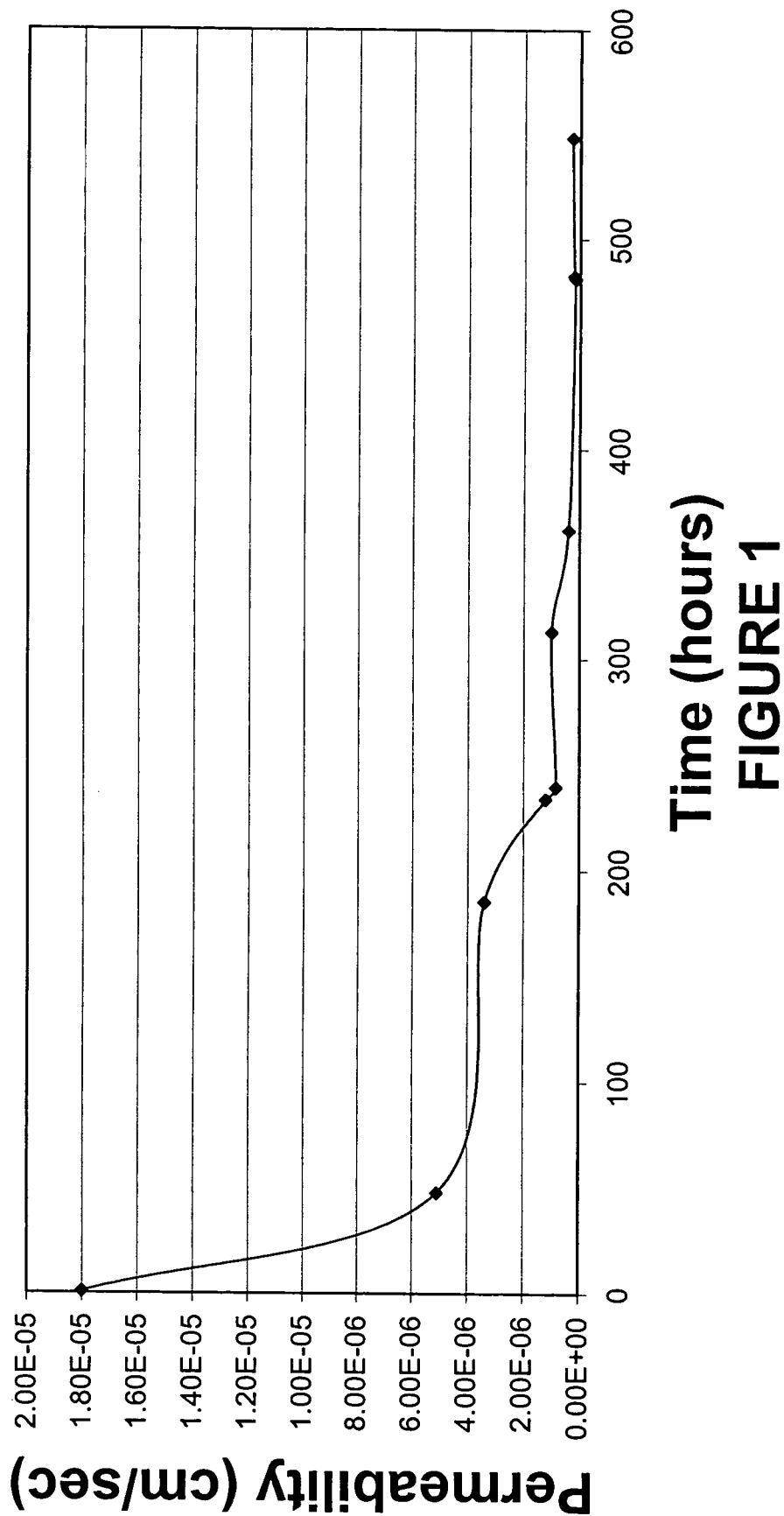
FIG. 1 is a graph of test results on a first sample in accordance with the method of the invention.

This technology emphasizes compatibility with ambient natural conditions, and is a natural analog process; the results and predicted durability of a treatment can be evaluated by comparison with natural geologic examples. The technology stiffens or solidifies soil/rock masses in a way that is analogous to the natural formation of sedimentary rock (lithification).

By using this technology, hazardous sites can be remediated in situ, by the introduction of finely divided solids or slurries, or liquid chemicals, by injection with drilled pathways and installed pipes, by use of seepage trenches, and/or by admixture of solid remediation components, and/or by direct admixture of various components as by commercial soil-mixing technologies. This avoids removal and off-site treatment and disposal of the waste/soil. The products of the remediation process are artificially produced analogs of naturally occurring substances or reaction breakdown products that are not hazardous.

Moreover, natural analog minerals can be caused to form during or after remediation. Those minerals are insoluble in the ambient system and chemically bind toxic components such as Pb and Cr ions from the waste. Additionally, in this sense chemicals and elements can be introduced into the waste during treatment that react in the waste zone and adsorb toxic chemical species. For example, iron in solution can be introduced into the waste zone and will then oxidize to produce Fe(OH)$_2$, a natural analog of the mineral limonite, that then adsorbs and chemically binds a toxic element such as chromium into this resultant insoluble mineral (limonite). These resultant minerals are called "designer minerals" in that specific reactions and mineral products can be produced, during and after application that bind, or "lock-up" specific toxic components that are in the contaminated soil/waste.

This technology can also be used to treat sites in anticipation of future events, for example, before they might become contaminated. Subsurface soil/rock of a site can be treated, for example, upon which a chemical plant, petroleum refinery, factory, etc., is to be built. This is "anticipatory remediation" in that specific treatments to reduce or eliminate the permeability of a specific site can be introduced in anticipation of future use of the site. Anticipatory remediation would be a general civil engineering/construction practice, usually involving non-hazardous soil/rock that is intended to protect the subsurface environment in anticipation of contamination. Such contamination would include, but not be limited to, future spills of hazardous materials on the treated site, accidental or otherwise.

Further use of this technology in the sense of anticipating future events involves the strengthening or solidification of soils/rocks by application of the process through admixture or injection of the chemical components that precipitate the carbonates or other products. For example, the technology can improve the stability of sites that are susceptible to changes or damage caused by erosion, flooding, subsurface water-flow or human activities. Soil/rock slumping and mass wasting of natural and artificial slopes can be reduced or eliminated by the stiffening or solidification of the soil/rock. Such solidification of soil/rock in regions of permafrost or seasonal freezing that reduces or eliminates permeability of sub-surface water, would remediate the effects of frost-heaving wherein water within soil bedrock freezes, expands, and causes subsurface and surface disturbance.

Examples of such applications are constructions of road-beds, building foundations, and aircraft landing strips. Yet another use of the process is to reduce or eliminate the permeability of soils that are susceptible to soil liquefaction, induced by human or natural events. Examples include soils that are susceptible to liquefaction during construction, or during use of constructions, such as roads and railways, and general construction in fresh water, marine and shore-line environments that involve saturated soils. In seismically active regions, or regions that are otherwise susceptible to seismic energy, soils that are prone to liquefaction could be treated to reduce or eliminate permeability to subsurface water and reduce or eliminate susceptibility to soil liquefaction.

The chemical remediation or treatment of waste sites operates by inducing chemical reactions or combinations of the waste components with materials that are added to, or impregnate, the waste in its host soil or matrix. The remediation effect also includes accompanying physical changes in the waste/host mass that act to support or enhance the chemically induced changes. In some applications the physical changes alone may be the primary remediation. The objective of chemical remediation in any case, however, is to isolate, or prevent migration of waste components from the disposal site. Inasmuch as transportation in ground or surface waters is the most common contaminant pathway for inorganic and many organic wastes, chemical remediation acts by a) altering waste components to insoluble or immobile forms that are stable under natural ambient conditions, and b) reducing the permeability of the waste site, or sealing it in respect to the transmission of ground or soil water. This technique of remediation is applied on a site-specific basis that is tailored to the site conditions and waste composition. Both the materials used in chemical remediation and the application methods are specific adaptations of this general concept.

Chemical Effects

Chemical effects that are invoked in this new remediation technology include:

precipitation from solution. For example:

$$Ca^{++}+CO_3^{--}=CaCO_3(\text{precipitate}) \text{ as calcite cement.}$$

Reactions between waste and added solutions yielding insoluble products. For example:

$$Pb^{++}+CO_3^{--}=PbCO_3;$$

$$Ba^{++}+Cr_2O_7^{--}=BaCr_2O_7;$$

$$2Hg^{++}+Na_2S_2=2HgS+2Na^+.$$

Adsorption of ions is effected by added adsorptants. For example: $Pb^{++}$ adsorbed and chemically bound into $Fe(OH)_2$ or other basic iron hydroxy-oxides. Such adsorptants can be created by the use of $FeCl_3$ solution in addition to the calcium ion solution, wherein exposure to alkaline pH will cause the precipitation of ferric hydroxide solid, a phase well known to adsorb heavy metals and effectively remove them from further dispersal or migration, which subsequently flocculates to particulate form (limonite or goethite, etc.). No oxidation reduction step is needed, although ferrous iron solution could certainly be used in a specific case. For example:

$$FeCl_3=Fe(OH)_3(\text{sol or gel}).$$

In some cases oxidation-reduction couples can yield a more insoluble or less toxic product. For example:

$$As^{5+}+2HOH+3Fe^0=As^{3+}+Fe^{++}(FeOH)_2$$

$$6Fe^{++}+Cr_2O_7^{--}=Cr_2O_4^{--}+6Fe^{3+}.$$

Reactions can produce components known to occur as stable phases in nature under the same ambient conditions. For example:

$$Ca(OH)_2+CO_2=CaCO_3+HOH;$$

$$Ca^{++}+SO_4^{--}=CaSO_4;$$

$$2Mg^{++}+HOH+CO_2=Mg_2(OH)_2CO_3(\text{basic magnesium carbonate}).$$

Buffering capacity provided at the site helps complete reactions and provides continued reaction capacity, and helps control pH.

Physical Effects

Physical changes that are intended to accompany a chemical remediation application include a reduction of soil/waste permeability and an increase in soil/waste cohesion or consolidation as a result of pore-filling and cementation/crystal growth enhancements. These changes are desired in order to restrict or inhibit the long-term access of ground/soil water to the waste, and any resultant leaching effects. An example of this is the NAS process which introduces a calcium carbonate matrix into the waste zone via application techniques that include:

a) Admixture of solid reactants with the waste, which subsequently react in the presence of water (e.g., $CaCl_2$ and $Na_2CO_3$).

b) Admixture of finely particulate solid components that subsequently crystallize, react, or bond with the waste/soil (e.g., $CaCO_3$ as calcite or aragonite, $Ca(OH)_2$—hydrated lime, CaO—lime, and others). A variation of this technique with added matrix materials (e.g., fly ash, incinerator ash, cement kiln slag and ash, etc.) can be used to fill larger void spaces of coarse ground/waste materials such as gravels, coarse sands, waste debris, etc., found in abandoned mine workings.

c) Introduction or impregnation of the waste zone, which is waste and admixed soil or overburden, with sequential solutions that react to produce a precipitate that fills pore-space (e.g., $CaCl_2$ (solution)+$Na_2CO_3$ (solution)=$CaCO_3$ (precipitate)+2NaCl (solution loss to external soil/groundwater). This application of the solutions can be repeated until refusal occurs. Other examples of these solutions include $CaCl_2+Na_2SO_4=CaSO_4$ (precipitate)+NaCl (solution); $CaCl_2+Na_2HPO_4=Ca_3(PO_4)_2$ (precipitate)+NaCl (solution).

d) Sequential solution-gas phase impregnation of the waste zone to produce a calcium carbonate precipitate and cementing action, or result, as the reaction proceeds. For example:

$$2NaOH+CaCl_2=Ca(OH)_2(\text{precipitate})+2NaCl(\text{solution});$$

$$Ca(OH)_2+CO_2(\text{introduced})=CaCO_3+2(OH^-).$$

Another embodiment of this application is the admixture of solid hydrated lime or the introduction of slaked lime into the waste zone prior to the introduction of $CO_2$. Yet another embodiment of the above remediation applications is the introduction of silica gel into the waste zone as the pore-filling agent. This can be accomplished via infiltration or impregnation of an aqueous alkali-silicate solution to which a suitable gelling agent (e.g., brine salts) has been added at the point of solution introduction so that gelation occurs after emplacement. However, to prevent dehydration of the gel, this embodiment is restricted mostly to wastes of acid pH at and within the saturated zone.

Example I

A specific example including the results of a field trial of this invention is shown below.

Sample and In-Situ Measurement Collection

Samples of "Solvay" waste (waste material produced by Solvay Process Corporation primarily from the production of soda ash) were collected from the surface (upper 24 inches) of Honeywell waste bed #14 in Syracuse, N.Y. Honeywell International is currently the owner of the former Solvay waste beds. The samples were hand collected and transported in polyethylene-lined, five gallon pails that were sealed. At the time of collection in-situ measurements for moisture, wet density and dry density were measured with a Troxler nuclear gauge (Troxler, 349 1-B Series, Surface Moisture-Density Gauge) at the sampling site. Additional measurements were made at approximately 20 meters from the sampling site along N-S, and E-W axes. Samples were collected Jun. 7, 2000. The GPS coordinates for the sampling site and field measurement sites, moisture and density measurements are given in Table 1.

TABLE 1

Honeywell waste bed sampling

| SITE LOCATION | SAMPLE LOCATION | MOISTURE[1] | WET DENSITY[2] | DRY DENSITY[2] |
|---|---|---|---|---|
| 43°03'95N 76°15'70W | 43°03'96N 76°15'70W | 118.6 | 76.7 | 35.1 |
| 43°03'95N 76°15'71W | | 91.0 | 77.9 | 40.8 |
| 43°03'95N 76°15'70W | | 101.2 | 73.1 | 35.3 |
| 43°03'95N 76°15'68W | | 85.8 | 74.0 | 39.8 |
| 43°03'95N 76°15'69N | | 85.1 | 79.7 | 43.1 |

[1]Moisture by Dry Weight;
[2]lbs/Ft$^3$

Standardized Testing

The NAS chemical process was tested for its ability to reduce the hydraulic conductivity of Honeywell waste bed material. The following testing methods and protocols were used in conducting the testing:

Laboratory Services:
Parrott-Wolff, Inc.
East Syracuse, N.Y. 13057
(Hydraulic Conductivity, Proctor Tests)
Life Science Laboratory
East Syracuse, N.Y. 13057
(process solution preparation)

Analytical Methods:
ASTM D 5084-90: Standard Test Method for Measurement of Hydraulic Conductivity of Saturated Porous Materials Using a Flexible Wall Permeameter
ASTM D 89$: Test Method for Laboratory Compaction Characteristics of Snits Using Standard Effort (12.400 ft. lbs/ft$^3$)
ASTM D 2922: Standard Test Method for Density of Soil and Soil-Aggregate in Place by Nuclear Methods (Shallow Depth)
ASTM D 3017: Standard Test Method for Water Content of Soils and Rock in Place by Nuclear Methods (Shallow Depth)

Equipment:
Troxler 3411-B Series Surface Moisture-Density Gauge
Brainard-Kilman E-4flO Digital Transducer integrated with a Trautwein Flexible-Wall Permeameter and Bladder Accumulator Process Fluids:
The specific chemical composition of the process fluids used in the testing of the Natural Analog System are proprietary. Process fluid "A" is a carbonate source delivered at ~85% saturation and Process fluid "B" is a calcium ion source delivered at 100% saturation.

Procedure Application
Sample #14207C

| DATE | PROCEDURES |
|---|---|
| Sep. 5, 2000 | The sample material was compacted in accordance with ASTM D698 (Standard Compaction). The water content, at the time of compaction was 93.8 as a percent of dry weight. The dry density, after compaction, was determined to be 44.3 pcf. |
| Sep. 6, 2000 | The sample was placed into the trixial confinement cell. A #200 (0.074 mm) size stainless steel mesh screen was used in place of the typical filter paper and porous stone, in order to avoid any false positive reduction in permeability due to clogging in the paper and/or stone. The sample saturation process began as backpressure was applied by simultaneously increasing the cell pressure and the influent and effluent pressures in 5 psi increments. During this incremental procedure, the influent and effluent pressures are kept equal while the cell pressure is maintained at 5 psi greater than the influent and effluent pressures. During this procedure, regulated air pressure is applied to a column of desired water. In turn, the deaired water transfers the applied pressure to deaired process fluid (previously diluted to 85.0 percent saturation) across an impermeable flexible membrane. Ultimately the deaired process fluid applies the regulated pressure to and into both ends |

-continued

Procedure Application
Sample #14207C

| DATE | PROCEDURES |
|---|---|
| | of the confined sample. This replaces any air in the influent and effluent lines, as well as any air filled pores in the sample, with the desired deaired fluid. |
| Sep. 8, 2000 5:27PM until Sep. 12, 2000 2:45PM | Saturation continued using the deaired process fluid "A" solution until a B coefficient (saturation) of 98% was obtained in the sample (a minimum of 95% saturation is normally required). |
| Sep. 12, 2000 3:01PM to 3:42PM | An initial gradient of 30 was then applied to the sample to begin the test run using the process fluid as the influent. Forty-one minutes after the test was begun, the first preliminary hydraulic conductivity was obtained and determined to be $1.8 \times 10^{-5}$ cm/sec. The hydraulic gradient was then reduced back to zero in order to temporarily halt the test. |
| Sep. 13, 2000 7:00PM to 8:31PM | The initial gradient of 30 was reapplied and a minimum of one void volume of process fluid (approximately 670 milliliters) was put through the sample. The hydraulic gradient was then reduced back to zero in order to temporarily halt the test. A hydraulic conductivity was not obtained after an additional 96 minutes of run time. |
| Sep. 14, 2000 8:36AM to 4:11PM | The initial gradient of 30 was reapplied. A second test run was begun and continued for 455 minutes. The second preliminary hydraulic conductivity was obtained and determined to be $5.1 \times 1^{-6}$ cm/sec. The hydraulic gradient was then reduced back to zero in order to temporarily halt the test. |
| Sep. 20, 2000 8:00AM to 9:50AM | The initial gradient of 30 was reapplied. The test run was begun and continued for 110 minutes. A third preliminary hydraulic conductivity was obtained and determined to be $3.4 \times 10^{-6}$ cm/sec. The hydraulic gradient was reduced back to zero in order to temporarily halt the test. |
| Sep. 22, 2000 8:13AM to 8:43AM | The initial gradient of 30 was reapplied and deaired process fluid "B" solution was introduced into the sample. The test run was begun and continued for 30 minutes. A fourth preliminary hydraulic conductivity was obtained and determined to be $1.2 \times 10^{-6}$ cm/sec. |
| Sep. 22, 2000 8:43AM to 4:18PM | The test continued to run an additional 455 minutes. A fifth preliminary hydraulic conductivity was obtained and determined to be $8.3 \times 10^{-7}$ cm/sec. The hydraulic gradient was reduced back to zero in order to temporarily halt the test and to let the sample "cure". |

-continued

Procedure Application
Sample #14207C

| DATE | PROCEDURES |
|---|---|
| Sep. 25, 2000 9:47AM to 4:59PM | The initial gradient of 30 was reapplied. The test run was begun and continued for 432 minutes. A sixth preliminary hydraulic conductivity was obtained and determined to be $9.9 \times 10^{-7}$ cm/sec. The hydraulic gradient was reduced back to zero in order to temporarily halt the test. |
| Sep. 27, 2000 8:42PM to 5:59PM | The initial gradient of 30 was reapplied and the process fluid "B" solution was introduced into the sample a second time. The test run was begun and continued for 557 minutes. A seventh preliminary hydraulic conductivity was obtained and determined to be $3.9 \times 10^{-7}$ cm/sec. The hydraulic gradient was reduced back to zero in order to temporarily halt the test. |
| Oct. 2, 2000 11:19AM to 5:20PM | The initial gradient of 30 was reapplied. The test run was begun and continued for 361 minutes. An eighth preliminary hydraulic conductivity was obtained and determined to be $1.6 \times 10^{-7}$ cm/sec. The hydraulic gradient was reduced back to zero in order to temporarily halt the test. |
| Oct. 4, 2000 8:00AM to 10:30AM | The initial gradient of 30 was reapplied and the test run was begun and continued for 150 minutes. A ninth hydraulic conductivity was obtained and determined to be $2.1 \times 10^{-7}$ cm/sec. The hydraulic gradient was reduced back to zero in order to temporarily halt the test. |
| Oct. 5, 2000 8:05AM to 12:35PM | The initial gradient of 30 was reapplied and the test run begun and continued for four consecutive constant readings were obtained. An end of test percent saturation of 98.0% was obtained. The average final hydraulic conductivity was obtained and determined to be $2.65 \times 10^{-7}$ cm/sec. |
| Oct. 6, 2000 | The sample was removed from the cell and photographed. |

The results of the test on sample #14707C are graphically illustrated in FIG. 1, and shown in Table 2 in the Test Results Summary, below. A final hydraulic conductivity value of $2.65 \times 10^{-7}$ cm/sec was achieved with the "Solvay" waste sample #14207C.

Sample #14207D

| DATE | PROCEDURES |
|---|---|
| Sep. 5, 2000 | The sample material was compacted in accordance with ASTM D698 (Standard Compaction). The water content at the time of compaction was 99.5 as a percent of dry weight. The dry density |

-continued

Sample #14207D

| DATE | PROCEDURES |
|---|---|
| Sep. 6, 2000 | after compaction was determined to be 41.8 pcf. The sample was placed into the trixial confinement cell. A #200 (0.074 mm) size stainless steel mesh screen was used in place of the typical filter paper and porous stone in order to avoid any false positive reduction in permeability due to clogging in the paper and/or stone. The sample saturation process began as backpressure was applied by simultaneously increasing the cell pressure and the influent and effluent pressures in 5 psi increments. During the incremental procedure, the influent and effluent pressures are kept equal while the cell pressure is maintained at 5 psi greater than the influent and effluent pressures. During this procedure, regulated air pressure is applied to a column of deaired water. In turn, the deaired water transfers the applied pressure to of test percent saturation of 98.0% was obtained. The average final hydraulic conductivity was obtained and determined to be $2.12 \times 10^{-5}$ cm/sec. |
| Oct. 6, 2000 | The sample was removed from the cell and photographed. |

Figure 2:
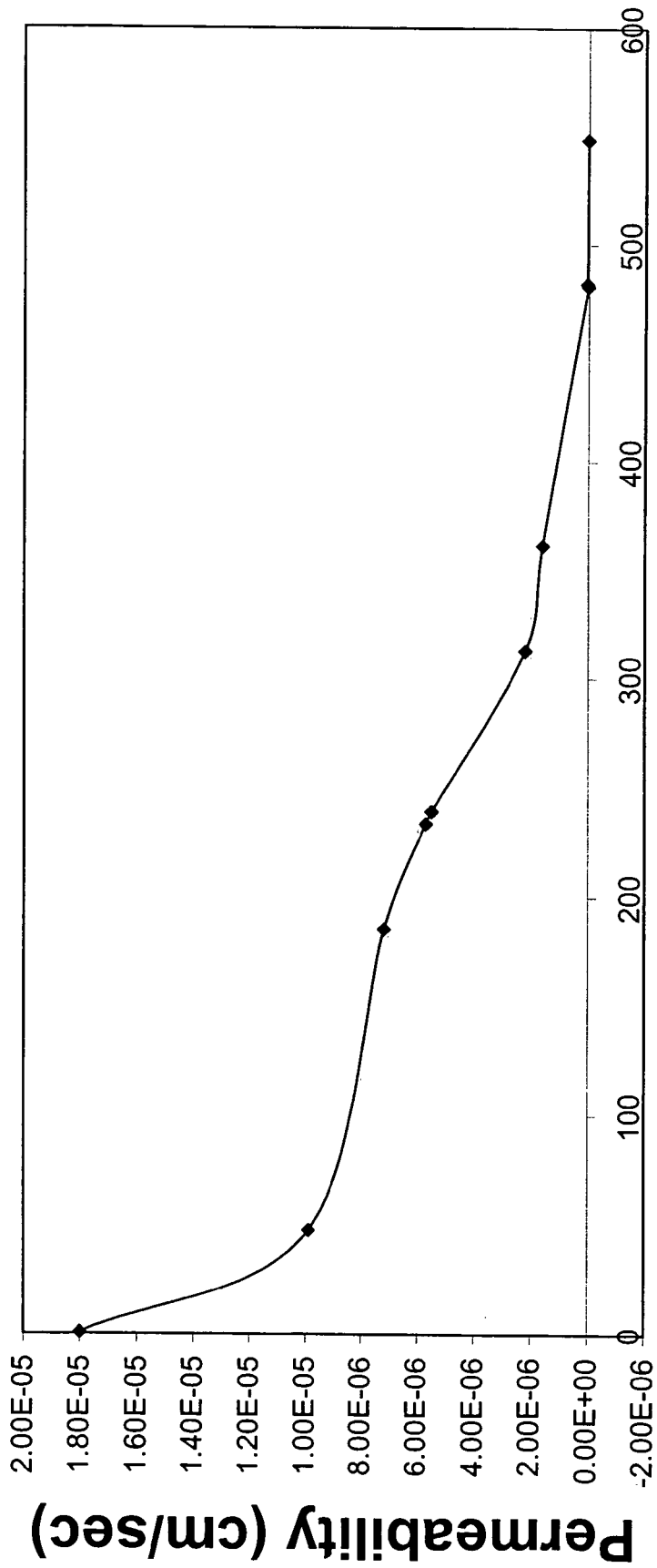
FIG. 2 is a graph of test results on a second sample in accordance with the method of the invention.

The results of the test on sample #14207D are graphically illustrated in FIG. 2, and shown in Table 2 in the Test Results Summary, below. A final hydraulic conductivity value of $2.12 \times 10^{-8}$ cm/sec was achieved with "Solvay" waste sample #14207D.

Test Results Summary

The Natural Analog System process was tested on "Solvay" waste collected from a Honeywell wastebed in Central New York. Two samples were prepared and tested at the Parrott-Wolff Laboratories using standard ASTM testing procedures. The goal of the testing was to determine the utility of the NAS process to effectively reduce permeability of ground, and reduce or eliminate leachate from waste beds and to remediate subsurface contamination plumes of chemical contaminants resulting from former Honeywell chemical operations. Cementation of the host material was achieved in a relatively short time. The results show a strong capacity for the process to reduce permeability in the host material, effectively reducing water flow through and thus isolating the material from the environment.

Key Results

Figure 3:
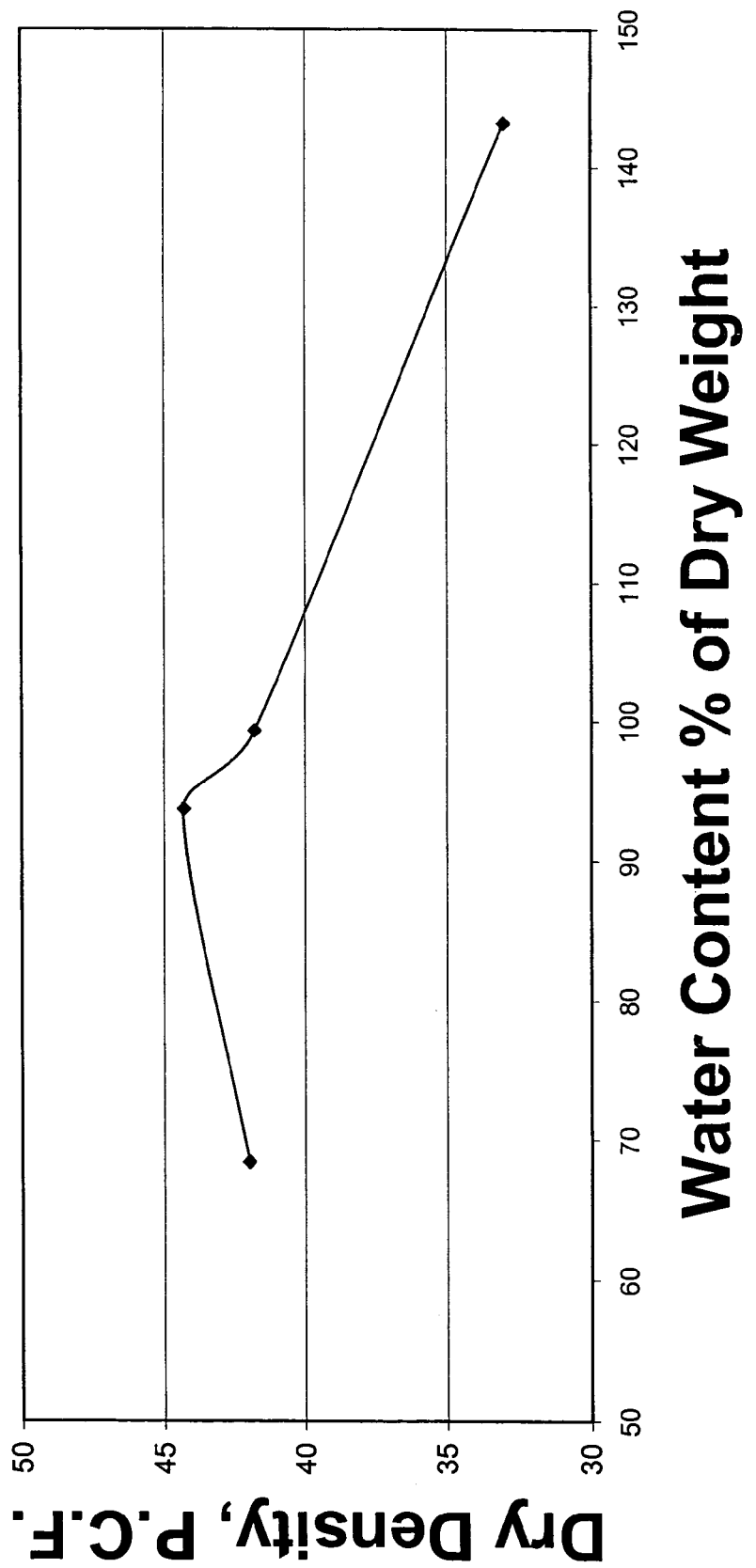
FIG. 3 is a moisture-density (i.e., Proctor) curve showing the relationship between the dry unit weight (density) and the water content of the waste material for a given compactive effort.

Test results show that the NAS process significantly reduced the hydraulic conductivity of the host material from $1.8 \times 10^{-5}$ cm/second to $2.65 \times 10^{-7}$ cm/second in approximately 550 hours for sample #14207C which represents a 98.53% reduction. The values for sample #14207D were from $1.8 \times 10^{-5}$ cm/second to $2.12 \times 10^{-8}$ cm/second in approximately 548 hours which represents a 99.88% reduction. It is noteworthy that both tests were terminated after hydraulic conductivities were reached that met or exceeded required values for remedial isolation technologies. It is expected that hydraulic conductivities would continue to decrease and reach final values typical for the crystalline structure of the cementing compound, a natural analog of calcite. FIG. 3 shows the moisture-density curve (Proctor curve) with the relationship between the dry unit weight (density) and the water content of the waste material for a given compactive effort.

TABLE 2

Hydraulic Conductivity (k) Study Test Results
And Timeline for Testing of Allied Waste Material

| Lab I.D. #14207C | | Lab I.D. #14207D | |
|---|---|---|---|
| Cumulative Elapsed Time | Hydraulic Conductivity (k) (cm/sec) | Cumulative Elapsed Time | Hydraulic Conductivity (k) (cm/sec) |
| 0 Hours 41 Minutes | $1.8 \times 10^{-5}$ | 0 Hours 41 Minutes | $1.8 \times 10^{-5}$ |
| 48 Hours 24 Minutes | $5.1 \times 10^{-6}$ | 47 Hours 24 Minutes | $9.9 \times 10^{-6}$ |
| 185 Hours 16 Minutes | $3.4 \times 10^{-6}$ | 185 Hours 15 Minutes | $7.2 \times 10^{-6}$ |
| 233 Hours 41 Minutes | $1.2 \times 10^{-6}$ | 233 Hours 38 Minutes | $5.7 \times 10^{-6}$ |
| 239 Hours 41 Minutes | $8.3 \times 10^{-7}$ | 239 Hours 9 Minutes | $5.5 \times 10^{-6}$ |
| 312 Hours 41 Minutes | $9.9 \times 10^{-7}$ | 312 Hours 48 Minutes | $2.2 \times 10^{-6}$ |
| 362 Hours 41 Minutes | $3.8 \times 10^{-7}$ | 361 Hours 26 Minutes | $1.6 \times 10^{-6}$ |
| 481 Hours 41 Minutes | $1.68 \times 10^{-7}$ | 481 Hours 4 Minutes | $2.71 \times 10^{-8}$ |
| 523 Hours 41 Minutes | $2.07 \times 10^{-7}$ | 482 Hours 19 Minutes | $5.7 \times 10^{-8}$ |
| 549 Hours 41 Minutes | $2.65 \times 10^{-7}$ | 548 Hours 19 Minutes | $2.12 \times 10^{-8}$ |

Since other modifications and changes varied to fit particular operating requirements and environments will be apparent to those skilled in the art, the invention is not considered limited to the examples chosen for purposes of disclosure and covers all changes and modifications which do not constitute departures from the true spirit and scope of the invention.

Having thus described the invention, what is desired to be protected by Letters Patent is presented in the subsequently appended claims.

What is claimed is:

1. A Natural Analog System (NAS) method to reduce the permeability of a ground, comprising:
    a) analyzing at least one characteristic of the ground selected from the group: hydrogeology, hydrochemistry, waste properties, remediation requirements, physical properties, and physical features;
    b) selecting at least one composition, wherein the composition is a solution or a solution and a gas phase, wherein the solution is selected from the group consisting of $CaCl_2$ (solution)+$Na_2CO_3$ (solution), $CaCl_2$ (solution)+$Na_2SO_4$, (solution), $CaCl_2$ (solution)+$Na_2HPO_4$ (solution), and $CaCl_2$ (solution)+NaOH (solution) based upon the at least one characteristic of the ground;
    c) impregnating the ground with the at least one composition, wherein constituents of the impregnated composition react to produce a precipitate that fills pore space in the ground; and d) repeating said impregnating step (c) until refusal occurs; thereby reducing the permeability of the ground.

2. The NAS method according to claim 1, wherein the ground is a waste zone.

3. The NAS method according to claim 2, wherein the waste zone comprises chemical constituents and the reduced permeability in the waste zone reduces or eliminates the elution of the chemical constituents in to the ground.

4. The NAS method in accordance with claim 1, wherein said solution and gas phase comprises 2NaOH (solution)+ $CaCl_2$ (solution), and wherein said gas phase comprises $CO_2$.

5. The NAS method in accordance with claim 1, wherein the precipitate filling the pore space is $CaCO_3$.

6. The method of claim 1, wherein the ground that is impregnated is a soil subject to liquefaction and is a road bed or building foundation in a permafrost region and seismic zones to stiffen or increase a cohesion of the ground.

7. The method of claim 1, wherein the ground of abandoned coal mines or other cavities that are subject to collapse is impregnated as an admixture with coal/fly/incinerator ash to fill the abandoned coal mines or other cavities.

8. The method of claim 1, wherein the ground of subsoils in construction sites is impregnated as an injectable low-viscosity slurry and an admixture using sand.

9. A method of reducing or eliminating the elution of chemical constituents in a waste zone, comprising:
   a) analyzing the waste zone to identify the chemical constituents for which immobilization is particularly desirable;
   b) impregnating said waste zone with a known increment of suitable solutions at least equal to a calculated amount required to react with said chemical constituents forming insoluble reaction products by selectively immobilizing the chemical constituents in the waste zone, and producing insoluble reaction products from reaction between said chemical constituents and said suitable solutions;
   c) further impregnating the waste zone with at least one composition, wherein constituents of the impregnated composition react to produce a precipitate that fills pore space in the waste zone; and
   d) repeating said impregnating step (c) until refusal occurs; thereby forming a waste zone with reduced permeability.

10. The method of reducing or eliminating the elution of the chemical constituents in a waste zone according to claim 9, wherein one of chemical constituents comprises lead, and the suitable solution includes carbonic acid.

11. The method of reducing or eliminating the elution of chemical constituents in a waste zone according to claim 9, wherein one of the chemical constituents comprises mercury and the suitable solution includes sodium sulfide.

12. The method of reducing or eliminating the elution of chemical constituents in a waste zone according to claim 9, wherein one of the chemical constituents comprises chromate ion $(Cr_2O_7)^{2-}$ and the suitable solution includes barium ion $(Ba^{2+})$.

13. The method of reducing or eliminating the elution of chemical constituents in a waste zone according to claim 9, wherein said chemical constituents comprise a member of the group including lead, arsenic, mercury, chromium, and cadmium, and the suitable solution includes ferric chloride.

14. The NAS method in accordance with claim 9, wherein the precipitate filling the pore space is one of the group $CaCO_3$, $Ca_3(PO_4)_2$ and $CaSO_4$.

15. The method in accordance with claim 9, wherein the precipitate filling the pore space is one of the group $CaCO_3$, $Ca_3(PO_4)_2$ and $CaSO_4$.

16. The method in accordance with claim 9, wherein the composition comprises $FeCl_3$, (solution)+NaOH (solution).

17. A method of reducing or eliminating the elution of chemical constituents in a waste zone, comprising:
   a) analyzing the waste zone to identify the chemical constituents for which immobilization is particularly desirable;
   b) selectively immobilizing the chemical constituents in the waste zone by forming insoluble reaction products, wherein one of the chemical constituents comprises chromate ion $(Cr_2O_7)^{2-}$, and producing insoluble reaction products from reaction between said chemical constituents and suitable solutions by impregnating said waste zone with a known increment of said suitable solutions at least equal to a calculated amount required to react with said chemical constituents forming insoluble reaction products, wherein the suitable solution includes barium ion $(Ba^{2+})$;
   c) further impregnating the waste zone with the at least one composition, wherein constituents of the impregnated composition react to produce a precipitate that fills pore space in the waste zone; and
   d) repeating said impregnating step (c) until refusal occurs; thereby forming a waste zone with reduced permeability.

* * * * *